United States Patent
Bliss et al.

(10) Patent No.: US 7,974,035 B2
(45) Date of Patent: Jul. 5, 2011

(54) TIMING RECOVERY OPTIMIZATION USING DISK CLOCK

(75) Inventors: William Gene Bliss, Thornton, CO (US); Thomas V. Souvignier, Longmont, CO (US); Andrei E. Vityaev, San Jose, CA (US); Gregory L. Silvus, Boulder, CO (US)

(73) Assignee: Broadcom Corporation, Irvine, CA (US)

( * ) Notice: Subject to any disclaimer, the term of this patent is extended or adjusted under 35 U.S.C. 154(b) by 1041 days.

(21) Appl. No.: 11/823,612

(22) Filed: Jun. 28, 2007

(65) Prior Publication Data

US 2008/0002270 A1 Jan. 3, 2008

Related U.S. Application Data

(60) Provisional application No. 60/817,444, filed on Jun. 29, 2006.

(51) Int. Cl.
*G11B 5/09* (2006.01)
(52) U.S. Cl. .............. 360/51; 360/32; 360/65
(58) Field of Classification Search .............. None
See application file for complete search history.

(56) References Cited

U.S. PATENT DOCUMENTS

| 6,493,163 | B1 * | 12/2002 | Reed et al. ............. 360/51 |
| 6,775,084 | B1 * | 8/2004 | Ozdemir et al. ............ 360/55 |
| 6,810,485 | B2 * | 10/2004 | McEwen et al. ............ 713/503 |
| 7,248,549 | B2 * | 7/2007 | Rauschmayer ............ 369/47.28 |
| 7,508,611 | B2 * | 3/2009 | Buch et al. ............. 360/51 |
| 7,596,196 | B1 * | 9/2009 | Liu et al. ............. 375/354 |
| 7,643,233 | B2 * | 1/2010 | Bliss et al. ............. 360/25 |
| 7,675,702 | B2 * | 3/2010 | Watt et al. ............. 360/51 |
| 2006/0092803 | A1 * | 5/2006 | Tatsuzawa et al. ............ 369/59.22 |
| 2007/0009074 | A1 * | 1/2007 | Ma ............. 375/371 |
| 2007/0165319 | A1 * | 7/2007 | Fisher ............. 360/51 |
| 2007/0273996 | A1 * | 11/2007 | Watt et al. ............. 360/51 |

* cited by examiner

*Primary Examiner* — Dismery E Mercedes
(74) *Attorney, Agent, or Firm* — Garlick Harrison & Markison; Shayne X. Short

(57) ABSTRACT

Timing recovery optimization using disk clock. A novel means is presented to perform and provide control of the sampling frequency of a signal that is read from a disk within a hard disk drive (HDD). Two separate, yet somewhat cooperating control loops are employed to provide feedback control of the sampling frequency of the signal that is read from disk. A timing recovery loop and a disk clock loop operate in conjunction with one another according to some desired manner (which can be predetermined or adaptive) to ensure that the sampling of the signal is performed to a very accurate degree. In one implementation, the timing recovery loop governs the sampling rate until the disk clock loop has locked, from which time either the disk clock loop govern the sampling or some combination of the signals provided from the two loops govern the sampling.

30 Claims, 9 Drawing Sheets

TIMING RECOVERY OPTIMIZATION USING DISK CLOCK

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 60/817,444, entitled "Timing recovery optimization using disk clock,", filed Jun. 29, 2006, pending.

Incorporation by Reference

The following U.S. Utility Patent Application is hereby incorporated herein by reference in its entirety and is made part of the present U.S. Utility Patent Application for all purposes:

1. U.S. Utility patent application Ser. No. 11/711,485, entitled "Timing recovery optimization using disk clock,", filed Feb. 2, 2007, pending.

BACKGROUND OF THE INVENTION

1. Technical Field of the Invention

The invention relates generally to hard disk drives (HDDs); and, more particularly, it relates to timing recovery that is performed within such HDDs.

2. Description of Related Art

As is known, many varieties of memory storage devices (e.g. disk drives), such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices can be found in a wide variety of applications and can also employ other types of means by which to store information (e.g., optical storage systems). These devices, which also can include any type of rotating storage means, provide high storage capacity in a cost effective manner.

Within such memory storage devices, there is oftentimes a difficulty in performing timing recovery of a signal that is read from the disk, in that, appropriate digital sampling needs to be performed for accurate and effective recovery of the information within the signal read from the disk. For example, if improper digital sampling is performed on the signal that is read from the disk, then some of the data can potentially be inaccurately recovered. In another scenario, large portions or even all of the information within the signal read from the disk will not be able to be recovered. When this occurs, the system may try to re-read the data (e.g., via a re-try) which can be very time consumptive. In devices employing HDDs in which energy is at a premium (e.g., small hand held devices and/or battery operated devices), performing more disk accesses and read attempts than necessary is very wasteful in terms of the overall energy budget and will clearly reduce the time during which the device can be operated on a limited energy source.

Another source of potential problems with respect to timing recovery within devices employing HDDs is when the disk within the HDD is somehow off-center in its mounting. More specifically, a disk is mounted and turns so that the read/write heads can effectively access various portions of the disk surface or surfaces. Tracks of data are ideally circular in shape, and if mounted perfectly in the center of the disk, then the tracks of the disk are perceived as being without variation (i.e., they are smooth and the amplitude of the signal associated with the tracks does not vary as a function of location on the disk). However, through a variety of undesirable events that result in the imperfect central mounting of the disk within the device (e.g., improper central mounting of the disk during fabrication, mis-alignment of the disk's mounting resulting from an impact of the device such as if the device is dropped, etc.), the frequency of the signal associated with the tracks will then in fact vary as a function of location on the disk. The track following servo of the device must track radial run out and keep the amplitude of the signal near a constant level. For example, without this capability, the runout of approximately $\frac{1}{1000}$ of an inch could amount to approximately 100 tracks of the device being in error. With the RPM of the media being constant, the linear velocity of the head is proportional to the actual radius, and this radius clearly varies of the disk within the device is not properly centrally mounted. Since the frequency of the signal is proportional to the linear velocity, the frequency undergoes modulation with once around variation when the disk within the device is not properly centrally mounted.

Therefore, this variation of the frequency of the signal associated with the tracks can be viewed as being a modulation error. In such instances, the tracks of the disk actually look like an ellipse (and not a circle) when viewd from the center of rotation. Within devices employing disks having smaller form factor, the overall percentage of modulation error can be significantly bigger if the mounting of the disk is off-center. This modulation error looks like a repeatable frequency error when trying to read information from the tracks of the disk.

It is always desirable to perform sampling of a signal read from a disk within a HDD at the appropriate time, but when these problems as described above, among others, are existent within such a device, then improper sampling of the signal read from the disk can be catastrophic in terms of the devices performance. For example, the data stored within the HDD may simply be non-recoverable in the event that sampling is performed at the improper time.

For accurate performance and proper recovery of the data within the signals read from disk, the precision required for sampling can be seemingly extreme. For example, control of sampling frequency to parts per million is sometimes required of beneficial. There clearly exists a need in the art for a means by which timing recovery can be performed efficiently and with a high degree of precision.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
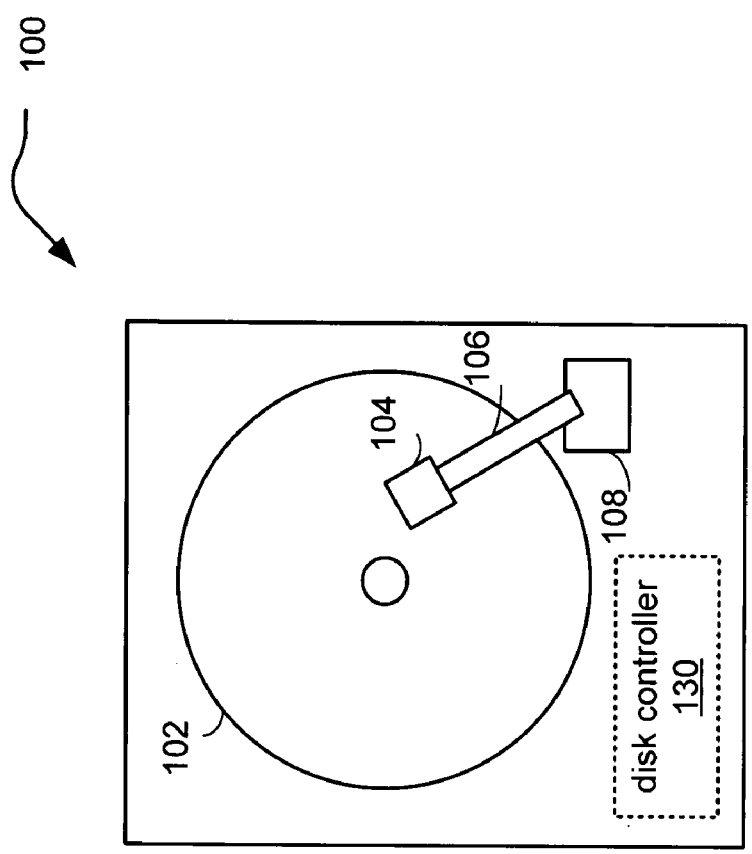
FIG. 1 illustrates an embodiment of a disk drive unit.

FIG. 1 illustrates an embodiment of a disk drive unit 100. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM, however, other velocities including greater or lesser velocities may likewise be used, depending on the particular application and implementation in a host device. In one possible embodiment, disk 102 can be a magnetic disk that stores information as magnetic field changes on some type of magnetic medium. The medium can be a rigid or non-rigid, removable or non-removable, that consists of or is coated with magnetic material.

Disk drive unit 100 further includes one or more read/write heads 104 that are coupled to arm 106 that is moved by actuator 108 over the surface of the disk 102 either by translation, rotation or both. A disk controller 130 is included for controlling the read and write operations to and from the drive, for controlling the speed of the servo motor and the motion of actuator 108, and for providing an interface to and from the host device.

Figure 2:
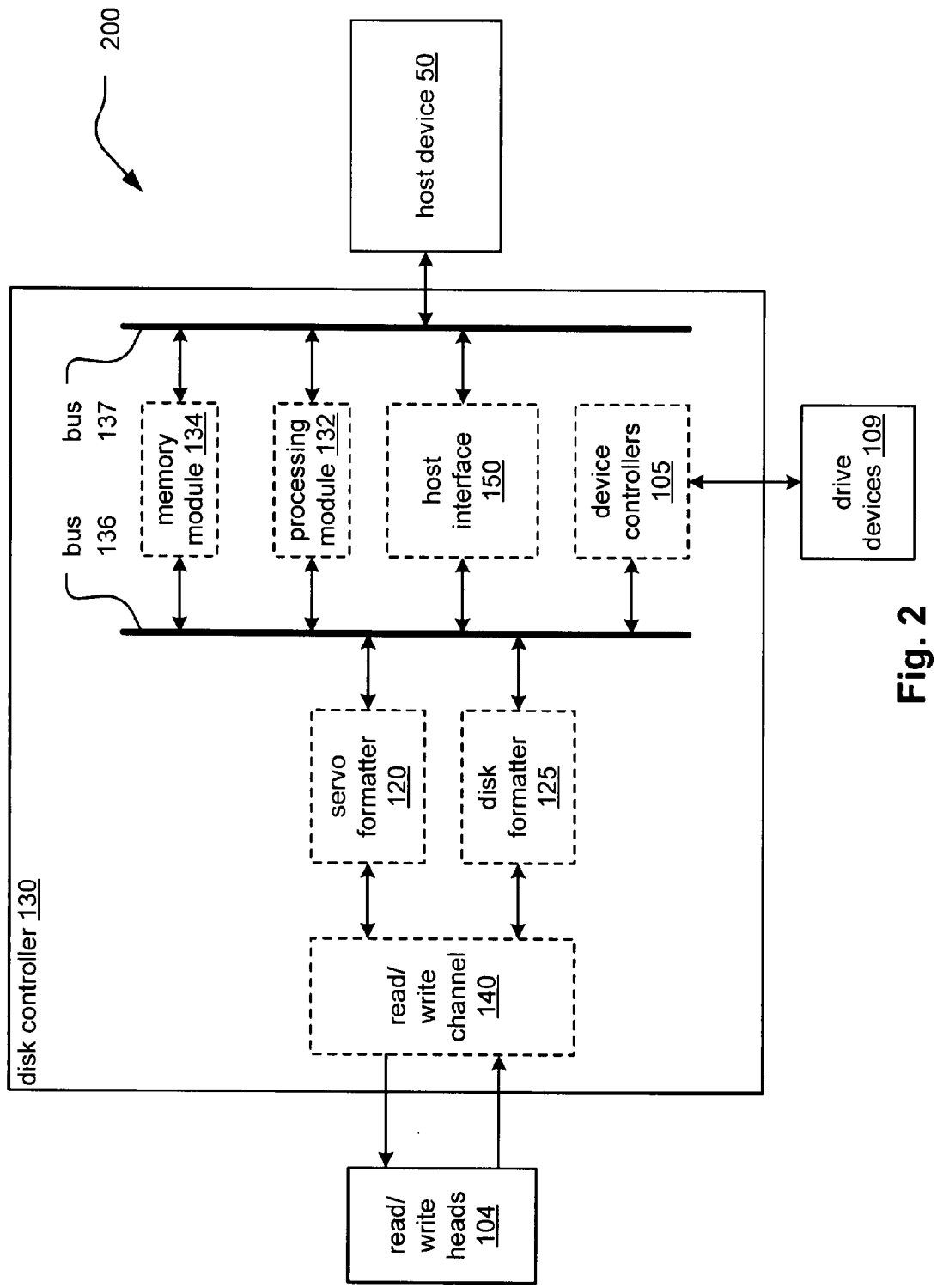
FIG. 2 illustrates an embodiment of an apparatus that includes a disk controller.

FIG. 2 illustrates an embodiment of an apparatus 200 that includes a disk controller 130. In particular, disk controller 130 includes a read/write channel 140 for reading and writing data to and from disk 102 through read/write heads 104. Disk formatter 125 is included for controlling the formatting of data and provides clock signals and other timing signals that control the flow of the data written to, and data read from disk 102. Servo formatter 120 provides clock signals and other timing signals based on servo control data read from disk 102. Device controllers 105 control the operation of drive devices 109 such as actuator 108 and the servo motor, etc. Host interface 150 receives read and write commands from host device 50 and transmits data read from disk 102 along with other control information in accordance with a host interface protocol. In one embodiment, the host interface protocol can include, SCSI, SATA, enhanced integrated drive electronics (EIDE), or any number of other host interface protocols, either open or proprietary that can be used for this purpose.

Disk controller 130 further includes a processing module 132 and memory module 134. Processing module 132 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes or functions in order to provide fault tolerance or redundancy. Alternatively, the function, steps and processes performed by processing module 132 can be split between different devices to provide greater computational speed and/or efficiency.

Memory module 134 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

Disk controller 130 includes a plurality of modules, in particular, device controllers 105, processing module 132, memory module 134, read/write channel 140, disk formatter 125, servo formatter 120 and host interface 150 that are interconnected via bus 136 and bus 137. Each of these modules can be implemented in hardware, firmware, software or a combination thereof, in accordance with the broad scope of the present invention. While a particular bus architecture is shown in FIG. 2 with buses 136 and 137, alternative bus architectures that include either a single bus configuration or additional data buses, further connectivity, such as direct connectivity between the various modules, are likewise possible to implement the features and functions included in various embodiments.

In one possible embodiment, one or more modules of disk controller 130 are implemented as part of a system on a chip (SoC) integrated circuit. In an embodiment, this SoC integrated circuit includes a digital portion that can include additional modules such as protocol converters, linear block code encoding and decoding modules, etc., and an analog portion that includes device controllers 105 and optionally additional modules, such as a power supply, etc. In a further embodiment, the various functions and features of disk controller 130 are implemented in a plurality of integrated circuit devices that communicate and combine to perform the functionality of disk controller 130.

When the drive unit 100 is manufactured, disk formatter 125 writes a plurality of servo wedges along with a corresponding plurality of servo address marks at equal radial distance along the disk 102. The servo address marks are used by the timing generator for triggering the "start time" for various events employed when accessing the media of the disk 102 through read/write heads 104.

Figure 3:
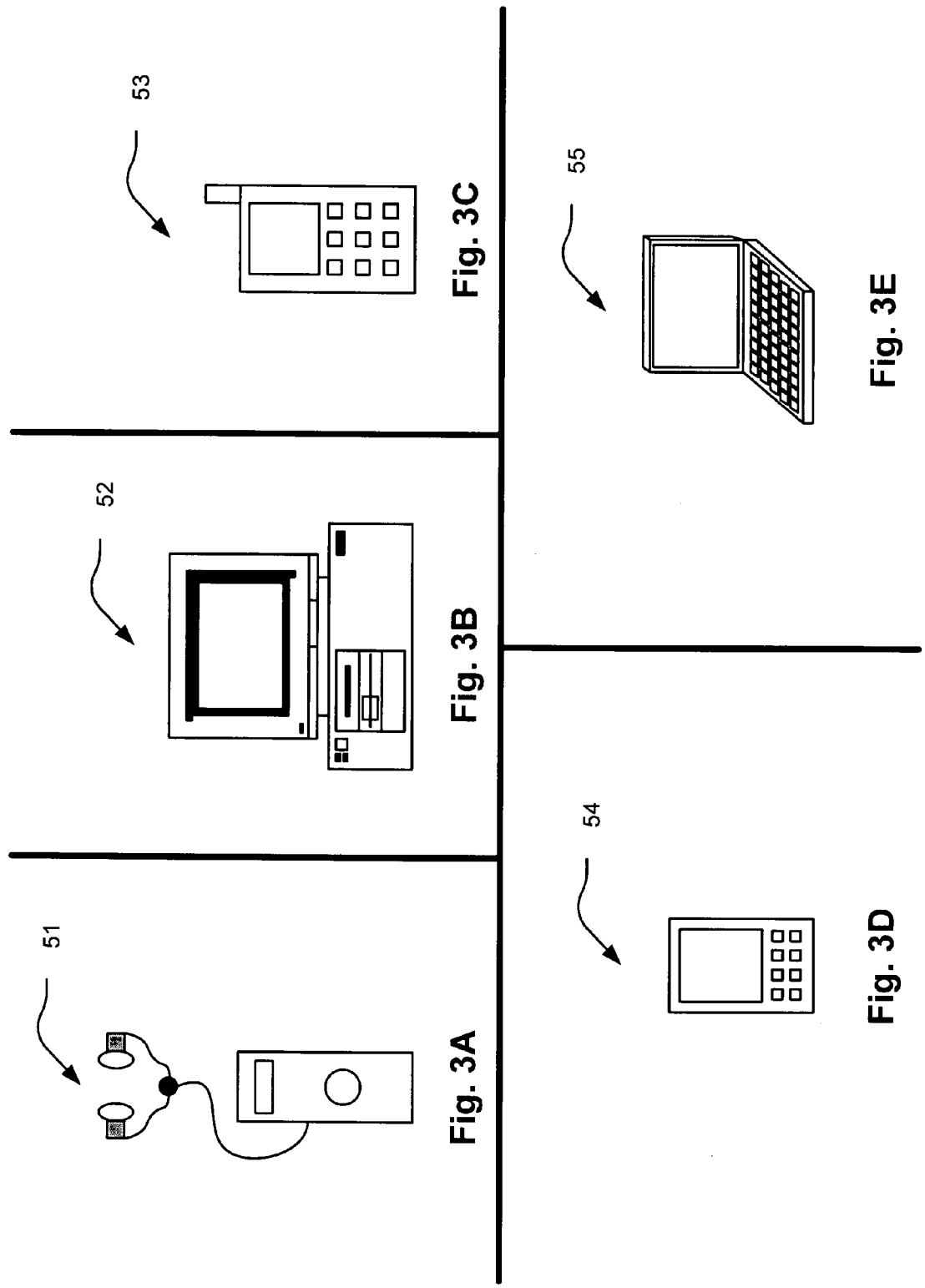
FIG. 3A illustrates an embodiment of a handheld audio unit.
FIG. 3B illustrates an embodiment of a computer.
FIG. 3C illustrates an embodiment of a wireless communication device.
FIG. 3D illustrates an embodiment of a personal digital assistant (PDA).
FIG. 3E illustrates an embodiment of a laptop computer.

FIG. 3A illustrates an embodiment of a handheld audio unit 51. In particular, disk drive unit 100 can be implemented in the handheld audio unit 51. In one possible embodiment, the disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

FIG. 3B illustrates an embodiment of a computer 52. In particular, disk drive unit 100 can be implemented in the computer 52. In one possible embodiment, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

FIG. 3C illustrates an embodiment of a wireless communication device 53. In particular, disk drive unit 100 can be implemented in the wireless communication device 53. In one possible embodiment, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In a possible embodiment, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

FIG. 3D illustrates an embodiment of a personal digital assistant (PDA) 54. In particular, disk drive unit 100 can be implemented in the personal digital assistant (PDA) 54. In one possible embodiment, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

FIG. 3E illustrates an embodiment of a laptop computer 55. In particular, disk drive unit 100 can be implemented in the laptop computer 55. In one possible embodiment, disk drive unit 100 can include a small form factor magnetic hard disk whose disk 102 has a diameter 1.8" or smaller, or a 2.5" drive. Disk drive 100 is incorporated into or otherwise used by laptop computer 52 to provide general purpose storage for any type of information in digital format.

Figure 4:
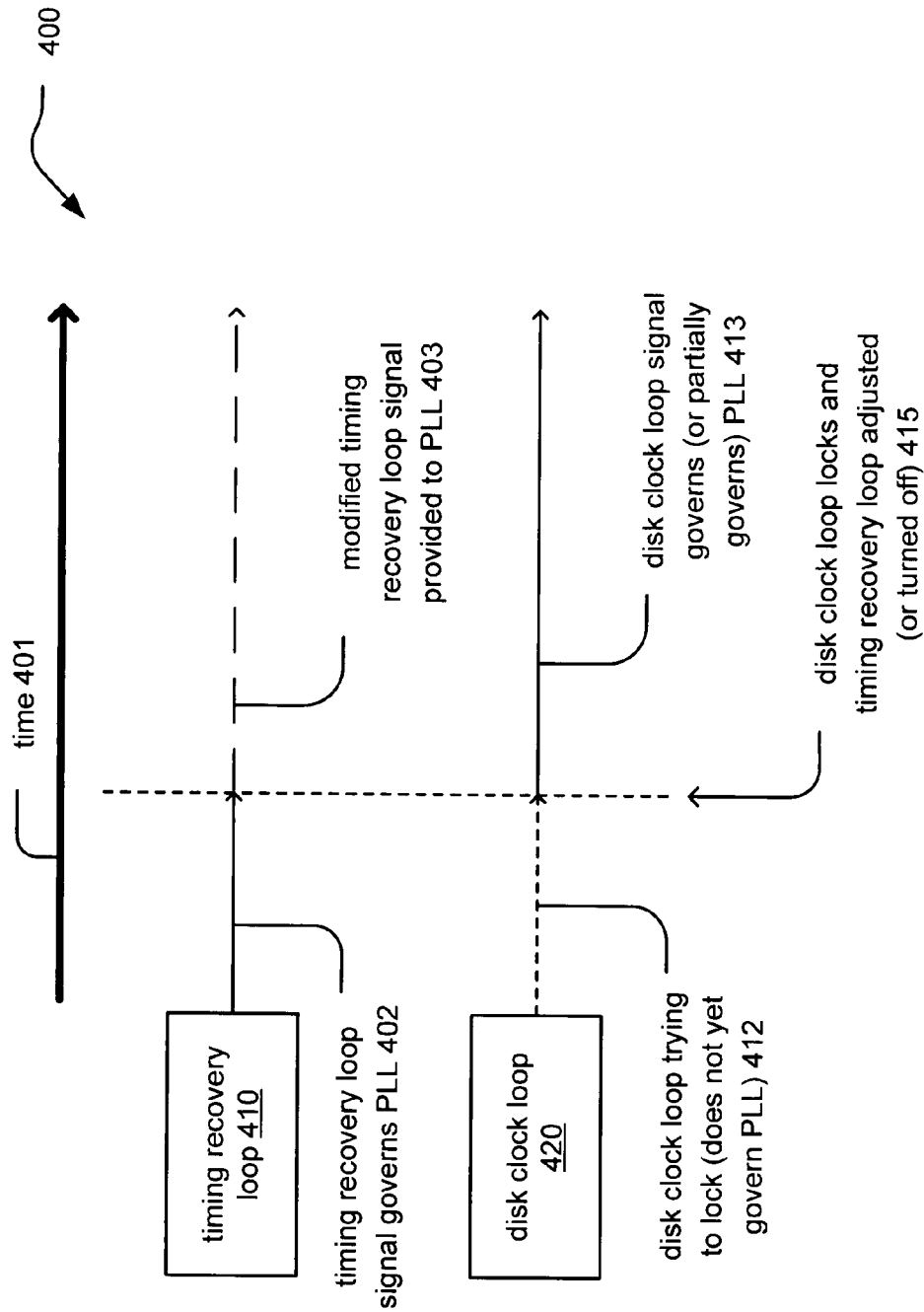
FIG. 4 illustrates an embodiment of signals provided to a phase locked loop (PLL) as a function of time.

FIG. 4 illustrates an embodiment 400 of signals provided to a phase locked loop (PLL) as a function of time. This embodiment 400 shows how two separate control loops, a timing recovery loop 410 and a disk clock loop 420, operate to provide signals for use by a phase locked loop (PLL) that operates to provide a control signal that is used by a means to perform digital sampling (e.g., an analog to digital converter (ADC)) of a signal that is read from a disk within a HDD. These various signals are shown as a function of time 402. In this context as well as within other embodiments, it is noted that digital sampling (e.g., as performed using an ADC) can be viewed to include generalized resampling of the digital data including other types of digital (rate change) sampling.

When performing timing recovery to be used to govern this sampling of the signal read from the disk, the timing recovery loop 410 initially governs the PLL, as shown by reference numeral 402. More specifically, when the disk clock loop 420 is trying to lock onto a disk clock (which corresponds to the actual rotational rate of the disk within the HDD), the information provided from the disk clock loop signal is not employed to govern the PLL, as shown by reference numeral 412.

Then, as shown by reference numeral 415, at the time at which the disk clock loop 420 locks, at least one operational parameter within the timing recovery loop 410 is adjusted in response thereto. If desired, the timing recovery loop 410 can simply be turned off at the point at which the disk clock loop 420 locks and provides a measure of the disk clock.

From this point on (i.e., after the disk clock loop 420 has locked), the disk clock loop signal provided from the disk clock loop 420 governs (or partially governs) the PLL, as shown by reference numeral 413. For example, some predetermined combination of the disk clock loop signal and the timing recovery loop signal may be employed by the PLL to govern the sampling of the signal that is read from the disk.

Generally speaking, as shown by reference numeral 403, a modified timing recovery loop signal is provided to the PLL after the disk clock loop 420 has locked. This modified timing recovery loop signal may simply be a signal providing no useful information to the PLL. One possible embodiment includes adjusting at least one operational parameter of the timing recovery loop 410 after the disk clock loop 420 has locked such that no frequency tracking component provided from the timing recovery loop 410 is provided within the timing recovery loop signal. This can be implemented by selectively adjusting certain of the operational parameters within the timing recovery loop 410. For example, this could be viewed as simply tracking the phase (and not the frequency) of the actual rotation of the disk once the disk clock loop 420 is up and running (i.e., once it has locked).

Figure 5:
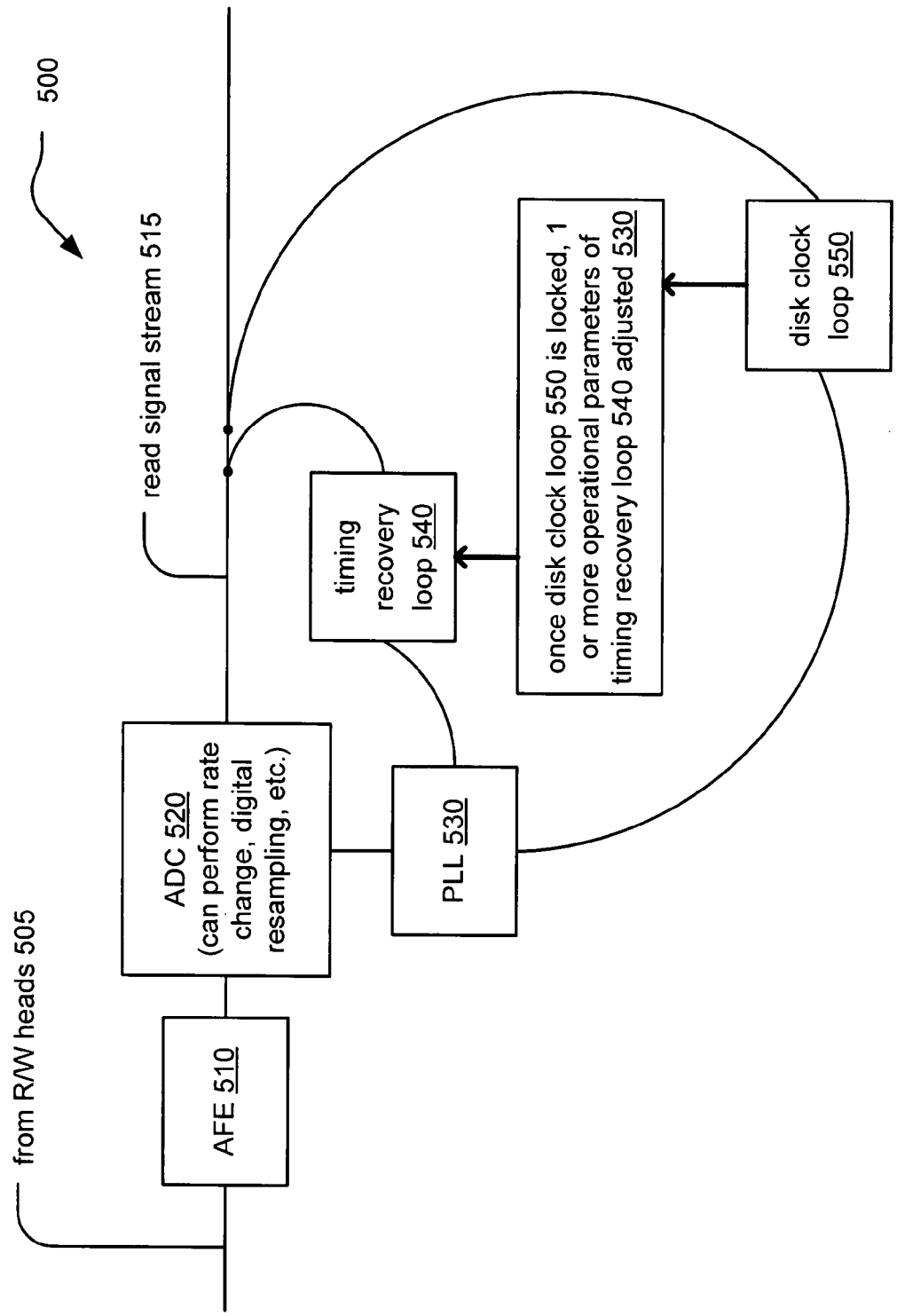
FIG. 5 illustrates an embodiment of an apparatus that is operable to perform timing recovery.

FIG. 5 illustrates an embodiment of an apparatus 500 that is operable to perform timing recovery. The apparatus 500 shows how a signal is read and received from the read/write heads 505 that couple to an arm that is moved by an actuator over the surface of the disk either by translation, rotation or both. This signal is provided to an analog to digital converter (ADC) 520. The read signal stream 515 is then the digitally sampled version of the signal provided to the ADC 520.

The manner in which the digital sampling of the signal provided to the ADC 520 is performed is critical to the effective and accurate recovery of data within that signal. A phase locked loop (PLL) 530 governs the sampling rate of the ADC 520 to ensure that accurate and effective digital sampling of the signal is performed. The PLL 530 can be any of a variety of PLL types including a fractional-N PLL type, a fractional-N sigma-delta PLL type, or a multi-modulus fractional-N sigma-delta PLL type. If some embodiments, a high-precision PLL is desirable. Some applications benefit from a PLL having precision that is less than even one part per million (e.g., sub-one per million precision).

There are two separate control loops that provide feedback signals to the PLL 530 to assist in the governing of the sampling frequency of the signal that is read from the disk. A first loop is a timing recovery loop 540 (which provides phase selection/phase control to the PLL 530), and a second loop is a disk clock loop 550 (which provides frequency control to the PLL 530). These two loops operate in conjunction with one another to provide useful signal information to the PLL 530, so that it can direct the ADC 520 to perform the digital sampling accurately and effectively.

The disk clock loop 550 takes some finite amount of time to lock and generate a disk clock that corresponds to the actual rotational rate (and sometimes the rotational position) of the disk within the HDD. Until the disk clock loop 550 locks, the information provided from a disk clock loop signal that is provided to the PLL 530 may not provide very effective information for the PLL 530. Until the disk clock loop 550 locks, the timing recovery loop 540 can be employed to provide a timing recovery loop signal to the PLL 530. It is noted here also that the magnitude by which the timing recovery loop signal affects the operation of the PLL 530 varies as a function of time. For example, when the disk clock is not yet locked, the timing recovery is a bit more "energetic" in changing the phase with time to make up for frequency error. Later, when the disk clock is well locked, then the phase changes with time are much less energetic (e.g., because there is very little frequency error).

As shown by reference numeral 530, once the disk clock loop 550 is locked, then one or more of the operational parameters of the timing recovery loop 540 is adjusted such that the timing recovery loop signal provided there from is now a modified timing recovery loop signal. In some instances, this adjustment of one or more of the operational parameters of the timing recovery loop 540 may include actually turning off the timing recovery loop 540. In other instances, this adjustment may include adjusting a gain of an amplification module within the timing recovery loop 540. It is noted that although the general term amplification module is employed herein, but it is noted that the gain may be less than one thereby performing attenuation as opposed to amplification in a given situation.

There is a wide variety of means by which these two control loop, the timing recovery loop 540 and the disk clock loop 550, may be implemented. Generally speaking, the timing recovery loop 540 is operable to determine the best phase to sample at every time of the disk's rotation, and the disk clock loop 550 is operable to determine the best frequency to set the PLL 530 over a longer time interval, such as from one servo wedge to the next of the disk within its rotation. From some perspectives and uses, where the disk clock is locked with very high accuracy, the disk clock loop 550 is operable also to provide a more accurate depiction of the actual location (phase) of the disk at any given time. Once the disk clock is available (i.e., once the disk clock loop 550 has locked), the disk clock signal provided from the disk clock loop 550 can then be employed to govern (or partially govern) the PLL 530. In other words, the contribution of the timing recovery loop 540 to govern the PLL 530 can be viewed as being adjusted down in some instances. The frequency tracking component of the timing recovery loop 540 is then reduced or (turned off) in this instance.

It is noted that, in typical operation, the timing recovery loop 540 does in fact perform at least some phase tracking. When the disk clock makes the frequency error to be (ideally) zero (or close to zero within an acceptance tolerance), then the timing recovery loop 540 doesn't need to perform 'as much' phase changing.

Figure 6:
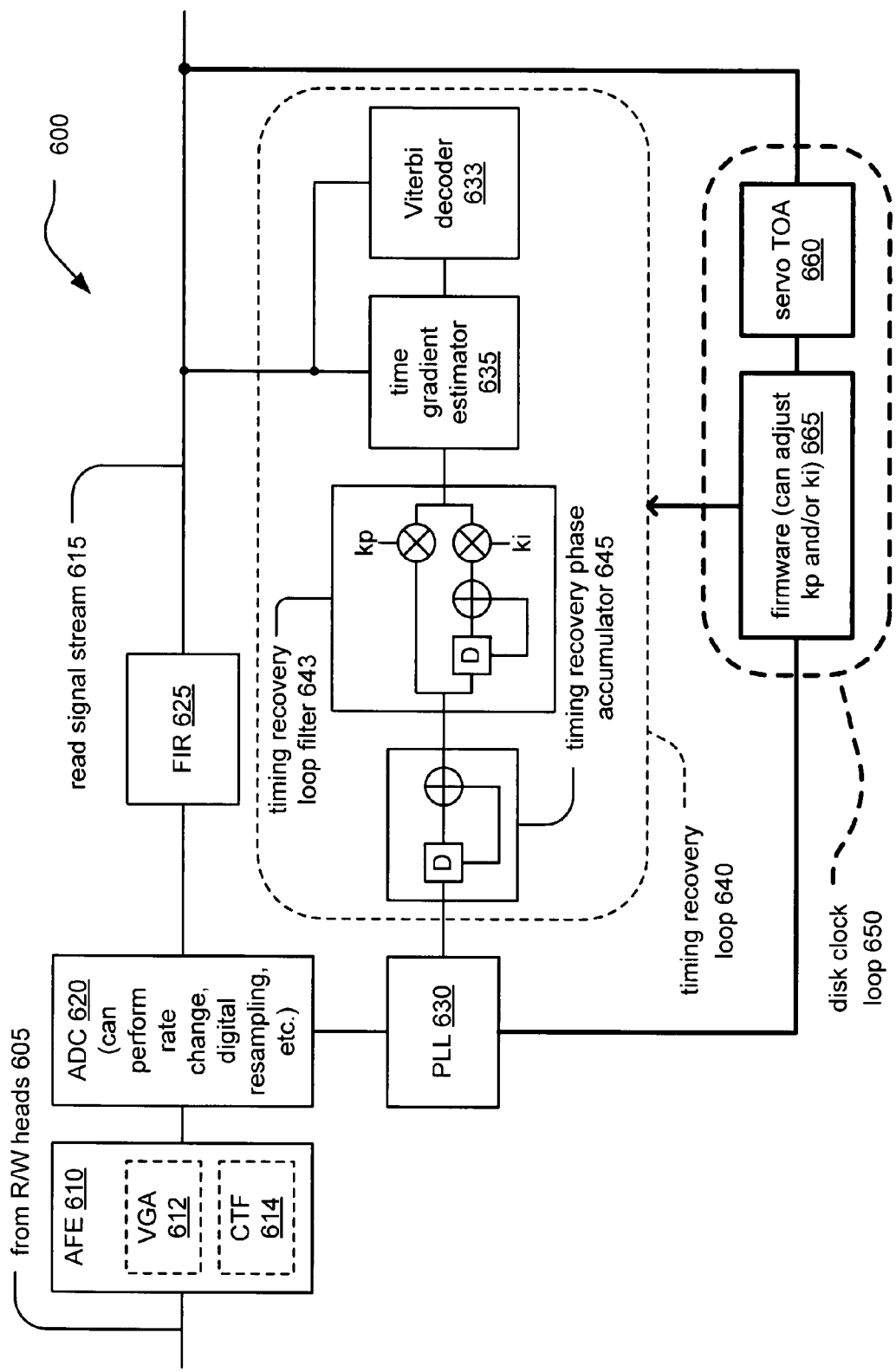
FIG. 6 illustrates an alternative embodiment of an apparatus that is operable to perform timing recovery.

FIG. 6 illustrates an alternative embodiment of an apparatus 600 that is operable to perform timing recovery. This apparatus 600 has some analogous features to the apparatus 500 of the FIG. 5. The apparatus 600 shows how a signal is read and received from the read/write heads 605 that couple to an arm that is moved by an actuator over the surface of the disk either by translation, rotation or both. This signal is provided to an analog front end (AFE) 610 that may include various components therein to perform analog signal processing of this signal. For example, the AFE 610 can include a variable gain amplifier (VGA) 612 and/or a continuous time filter (CTF) 614 to perform gain (or attenuation) processing and/or filtering processing of the signal that is read from the disk. After undergoing any processing within the AFE 610, the signal output there from is provided to an analog to digital converter (ADC) 620. As similarly mentioned above, it is again noted that digital sampling (e.g., as performed using the ADC 620 of the ADC 520 of the previous embodiment) can be viewed to include generalized resampling of the digital data including other types of digital (rate change) sampling.

The signal output from the ADC 620 is then the digitally sampled version of the signal provided to the ADC 620. Also, if desired, a finite impulse response filter (shown as FIR 625) can be implemented in line with the output from the ADC 620 to perform digital filtering thereon. This signal output from the FIR 625 can be viewed as being the digital version of the signal read from the disk, as shown by reference numeral 615.

There are two separate control loops that provide feedback signals to the PLL 630 to assist in the governing of the sampling frequency of the signal that is read from the disk. A first loop is a timing recovery loop 640 (which provides phase selection/phase control to the PLL 630), and a second loop is a disk clock loop 650 (which provides frequency control to the PLL 630). These two loops operate in conjunction with one another to provide useful signal information to the PLL 630, so that it can direct the ADC 620 to perform the digital sampling accurately and effectively.

It is noted that the PLL 630 can alternatively be partitioned into 2 separate modules and/or functional blocks, in that, a first portion of such a PLL receives the frequency control input (e.g., as shown by the bottom input to the PLL 630), yet a second portion of such a PLL is a 'phase selector' (sometimes referred to as a 'phase interpolator') that provides a digitally addressable phase delay to the output of the first portion of such a PLL (i.e., to perform interpolation of the PLL clock signal output there from).

Within the timing recovery loop 640, the digital signal output from the FIR 625 is provided to a Viterbi decoder 633 that is operable to employ the soft output Viterbi algorithm (SOVA) to determine a soft output that is indicative of the reliability of the information within the digital signal. For example the Viterbi decoder 633 is operable to determine whether the digital signal provided to it is reliable or not.

Within the timing recovery loop 640, the digital signal output from the FIR 625 is also provided to a time gradient estimator 635 that is operable to determine the rate of change of the digital signal. This can be viewed as determining an estimate of the error in the sampling phase, at least providing the sign of the error, which tells the timing recovery loop 640 in which direction the sampling phase should be adjusted. The output from the time gradient estimator 635 is provided to a timing recovery loop filter 643 that includes two separate paths in accordance with a proportional/integral implementation. A top path of the timing recovery loop filter 643 includes an amplification module that multiplies the signal by a gain, kp, which performs the proportional component within the timing recovery loop filter 643. A bottom path of the timing recovery loop filter 643 includes an amplification module that multiplies the signal by a gain, ki, and is followed by a summer whose feedback signal is from a delay module (shown by D) which performs the accumulation/integration component within the timing recovery loop filter 643.

The output from the timing recovery loop filter 643 is provided to a timing recovery loop phase accumulator 645 which includes a summer whose feedback signal is from a delay module (shown by D). The output from the timing recovery loop phase accumulator 645 is provided to the PLL 630's phase select input as a timing recovery loop signal.

Within the disk clock loop 650, the digital signal output from the FIR 625 is provided to a module that is operable to extract the servo time of arrival (TOA) there from, as shown by reference numeral 660. These servo TOAs can be viewed as a measurement of pure clocks that correspond to the actual arrival of the servo address marks (SAMs) on the disk as it is rotating within the HDD. These servo TOAs provide an accurate depiction of the actual location of the disk at a given time. The disk clock loop 650 also includes a firmware module 665 that is operable to process the servo TOAs to help determine the disk clock. After a finite period of time, or after processing a certain number of servo TOAs, the disk clock loop 650 is operable to lock thereby providing an accurate disk clock that corresponds to the rotational rate of the disk within the hard disk drive. In this embodiment of the invention, the firmware module 665 is also operable to direct the adjustment of at least one operational parameter within the timing recovery loop 640. It is also noted that the adjusting of the timing recovery loop 640 can also be static, in that, a first gain, kp, and a first gain, ki, can be employed during a first time when disk clock is available, and a second gain, kp, and a second gain, ki, can be employed during a second time when disk clock is not available (or vice versa). For example, the timing recovery could employ a first set of the gain, kp, and the gain, ki, for an acquisition mode of operation, and the timing recovery could employ a second set of the gain, kp, and the gain, ki, for a tracking mode of operation. In one possible implementation, the second gain, ki, could be set at 0 (zero) during an acquisition mode of operation, and in a tracking mode of operation both of the gain, kp, and the gain, ki, can be kept smaller than they are when disk clock is not available (e.g., without disk clock).

In some embodiments, the firmware module 665 is operable to adjust the gain of one or both of the amplification module having gain, kp, or the gain of the amplification module having gain, ki. In other words, the firmware module 665 is operable to adjust one or both of kp and ki once the disk clock loop 650 has locked. Once the disk clock loop 650 has locked, the timing recovery loop 640 can be adjusted. In some embodiments, the once the disk clock loop 650 has locked, the timing recovery loop 640 can be turned off completely. In even alternative embodiments, the gain, ki, can be set at 0 (zero) for an acquisition mode of operation and for a tracking mode of operation (which is practically turning off frequency tracking). In embodiments where the timing recovery loop 640 is turned off once the disk clock loop 650 has locked, the PLL 630 operates effectively using only a disk clock loop signal provided from the disk clock loop 650.

Generally speaking, the firmware module 665 is operable to adjust any of the operational parameters within the timing recovery loop 640 after the disk clock loop 650 has locked. For example, operational parameters within any of the other modules and/or functional blocks within the timing recovery loop 640 could also be adjusted by the firmware module 665 after the disk clock loop 650 has locked. The firmware module 665 could also be implemented to adjust additional operational parameters at other times as well. For example, an embodiment of the firmware module 655 could be employed to adjust one or more of the servo timing recovery parameters between startup and when the disk clock is well locked.

Figure 7:
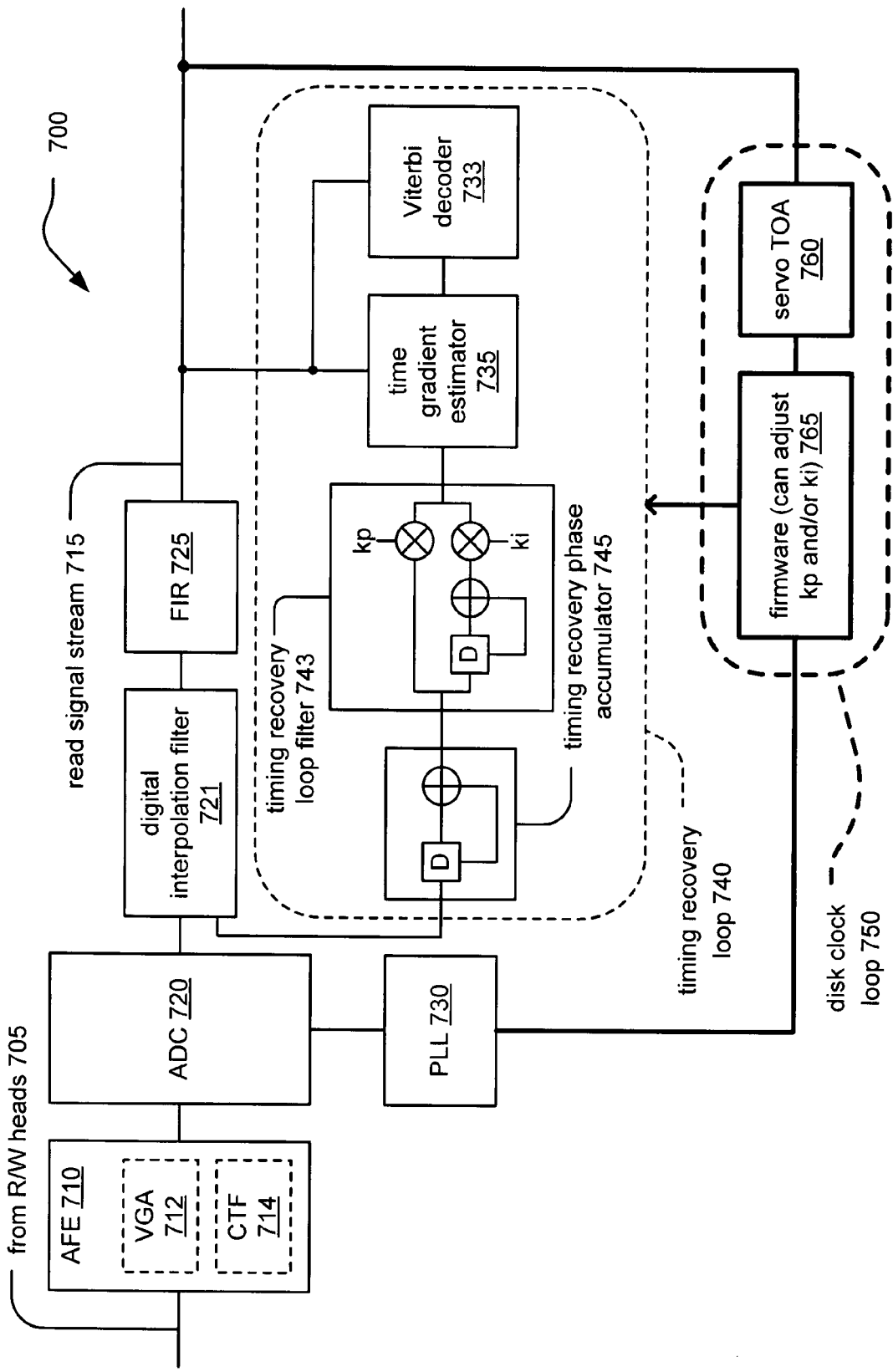
FIG. 7 illustrates an alternative embodiment of an apparatus that is operable to perform timing recovery.

FIG. 7 illustrates an alternative embodiment of an apparatus 700 that is operable to perform timing recovery. This apparatus 700 has some analogous features to the apparatus 500 of the FIG. 5 and to the apparatus 600 of the FIG. 6. The apparatus 700 shows how a signal is read and received from the read/write heads 705 that couple to an arm that is moved by an actuator over the surface of the disk either by translation, rotation or both. This signal is provided to an analog front end (AFE) 710 that may include various components therein to perform analog signal processing of this signal. For example, the AFE 710 can include a variable gain amplifier (VGA) 712 and/or a continuous time filter (CTF) 714 to perform gain (or attenuation) processing and/or filtering processing of the signal that is read from the disk. After undergoing any processing within the AFE 710, the signal output there from is provided to an analog to digital converter (ADC) 720. Within this embodiment, the output from the ADC 720 is provided to a digital interpolation filter 721 that is operable to perform generalized resampling of the digital data. The digital interpolation filter 721 can perform changing of the effective sampling instant (e.g., resampling using digital operations). The digital interpolation filter 721 can perform rata changing of the digital data output from the ADC 720.

The signal output from the ADC 720 is then the digitally sampled version of the signal provided to the ADC 720, and the signal output from the digital interpolation filter 721 is the desired 'modified' version thereof. Also, if desired, a finite impulse response filter (shown as FIR 725) can be implemented in line with the output from the digital interpolation filter 721 to perform digital filtering thereon. This signal output from the FIR 725 can be viewed as being the digital version of the signal read from the disk, as shown by reference numeral 715.

There are two separate control loops that provide feedback signals: (1) to the PLL 730 and (2) to the digital interpolation filter 721 to assist in the governing of the sampling frequency of the signal that is read from the disk. A first loop is a timing recovery loop 740 (which provides phase selection/phase control to the digital interpolation filter 721), and a second loop is a disk clock loop 750 (which provides frequency control to the PLL 730). These two loops operate in conjunction with one another to provide useful signal information to the PLL 730 and to the digital interpolation filter 721, so that it can direct the ADC 720 and the digital interpolation filter 721 to operate cooperatively and to perform the digital sampling (and resampling, if necessary or desired) accurately and effectively.

This embodiment particularly shows how a PLL is alternatively partitioned into 2 separate modules and/or functional blocks, in that, a first portion of such a PLL receives the frequency control input (e.g., as shown as the actual PLL 730 of this embodiment), and a second portion of such a PLL is a 'phase selector' (e.g., the digital interpolation filter 721).

Within the timing recovery loop 740, the digital signal output from the FIR 725 is provided to a Viterbi decoder 733 that is operable to employ the soft output Viterbi algorithm (SOVA) to determine a soft output that is indicative of the reliability of the information within the digital signal. For example, the Viterbi decoder 733 is operable to determine whether the digital signal provided to it is reliable or not.

Within the timing recovery loop 740, the digital signal output from the FIR 725 is also provided to a time gradient estimator 735 that is operable to determine the rate of change of the digital signal. This can be viewed as determining an estimate of the error in the sampling phase, at least providing the sign of the error, which tells the timing recovery loop 740 in which direction the sampling phase should be adjusted. The output from the time gradient estimator 735 is provided to a timing recovery loop filter 743 that includes two separate paths in accordance with a proportional/integral implementation. A top path of the timing recovery loop filter 743 includes an amplification module that multiplies the signal by a gain, kp, which performs the proportional component within the timing recovery loop filter 743. A bottom path of the timing recovery loop filter 743 includes an amplification module that multiplies the signal by a gain, ki, and is followed by a summer whose feedback signal is from a delay module (shown by D) which performs the accumulation/integration component within the timing recovery loop filter 743.

The output from the timing recovery loop filter 743 is provided to a timing recovery loop phase accumulator 745 which includes a summer whose feedback signal is from a delay module (shown by D). The output from the timing recovery loop phase accumulator 745 is provided to the digital interpolation filter 721 as a timing recovery loop signal.

Within the disk clock loop 750, the digital signal output from the FIR 725 is provided to a module that is operable to extract the servo time of arrival (TOA) there from, as shown by reference numeral 760. These servo TOAs can be viewed as a measurement of pure clocks that correspond to the actual arrival of the servo address marks (SAMs) on the disk as it is rotating within the HDD. These servo TOAs provide an accurate depiction of the actual location of the disk at a given time. The disk clock loop 750 also includes a firmware module 765 that is operable to process the servo TOAs to help determine the disk clock. After a finite period of time, or after processing a certain number of servo TOAs, the disk clock loop 750 is operable to lock thereby providing an accurate disk clock that corresponds to the rotational rate of the disk within the hard disk drive. In this embodiment of the invention, the firmware module 765 is also operable to direct the adjustment of at least one operational parameter within the timing recovery loop 740. It is also noted that the adjusting of the timing recovery loop 740 can also be static, in that, a first gain, kp, and a first gain, ki, can be employed during a first time when disk clock is available, and a second gain, kp, and a second gain, ki, can be employed during a second time when disk clock is not available (or vice versa). For example, the timing recovery could employ a first set of the gain, kp, and the gain, ki, for an acquisition mode of operation, and the timing recovery could employ a second set of the gain, kp, and the gain, ki, for a tracking mode of operation. In one possible implementation, the second gain, ki, could be set at 0 (zero) during an acquisition mode of operation, and in a tracking mode of operation both of the gain, kp, and the gain, ki, can be kept smaller than they are when disk clock is not available (e.g., without disk clock).

In some embodiments, the firmware module 765 is operable to adjust the gain of one or both of the amplification module having gain, kp, or the gain of the amplification module having gain, ki. In other words, the firmware module 765 is operable to adjust one or both of kp and ki once the disk clock loop 750 has locked. Once the disk clock loop 750 has locked, the timing recovery loop 740 can be adjusted. In some embodiments, the once the disk clock loop 750 has locked, the timing recovery loop 740 can be turned off completely. In even alternative embodiments, the gain, ki, can be set at 0 (zero) for an acquisition mode of operation and for a tracking mode of operation (which is practically turning off frequency tracking). In embodiments where the timing recovery loop 740 is turned off once the disk clock loop 750 has locked, the PLL 730 operates effectively using only a disk clock loop signal provided from the disk clock loop 750.

Generally speaking, the firmware module 765 is operable to adjust any of the operational parameters within the timing recovery loop 740 after the disk clock loop 750 has locked. For example, operational parameters within any of the other modules and/or functional blocks within the timing recovery loop 740 could also be adjusted by the firmware module 765 after the disk clock loop 750 has locked. The firmware module 765 could also be implemented to adjust additional operational parameters at other times as well. For example, an embodiment of the firmware module 755 could be employed to adjust one or more of the servo timing recovery parameters between startup and when the disk clock is well locked.

Figure 8:
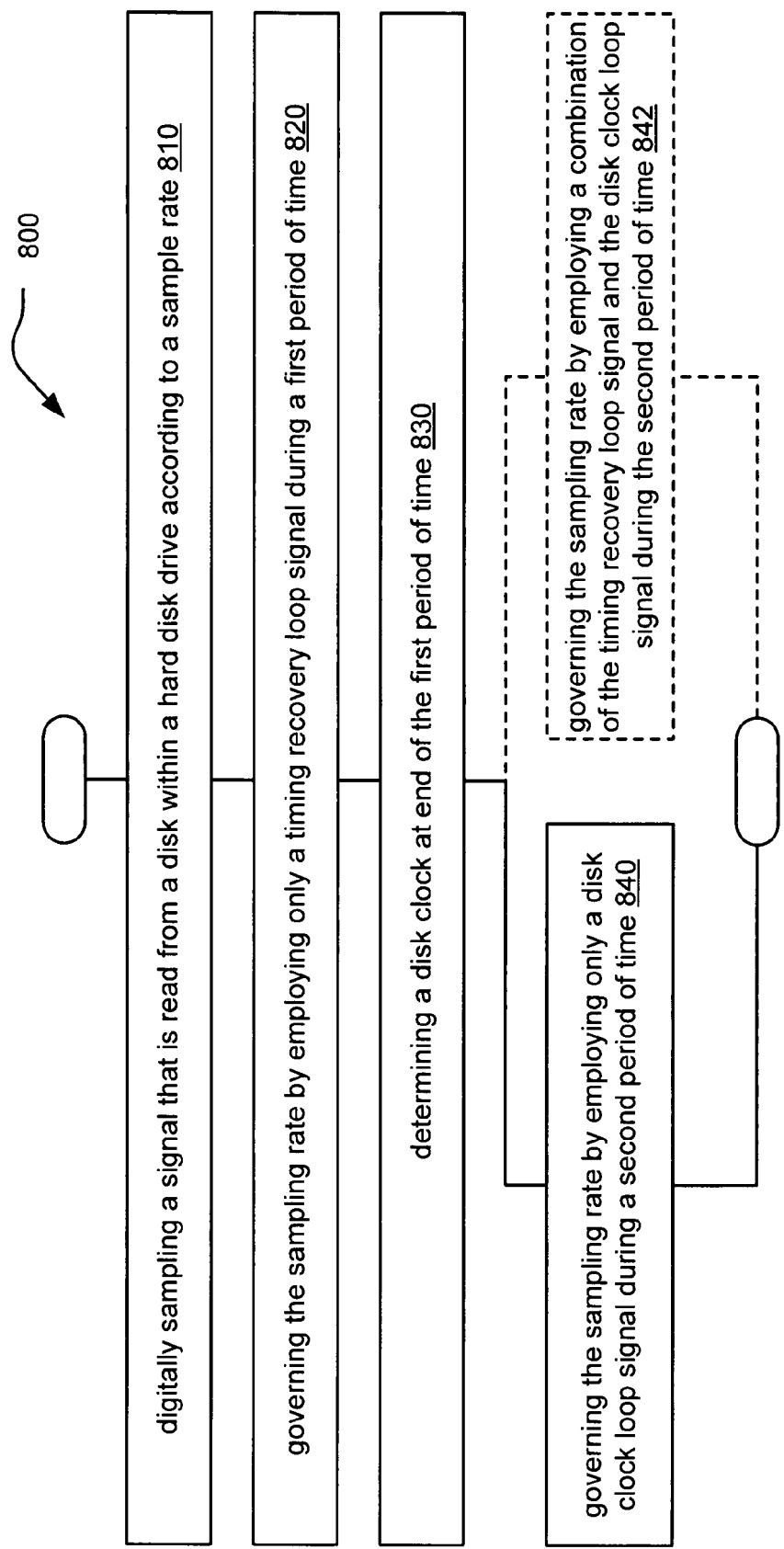
FIG. 8 illustrates an embodiment of a method that is operable to perform timing recovery.

FIG. 8 illustrates an embodiment of a method 800 that is operable to perform timing recovery. The method 800 initially operates by digitally sampling a signal that is read from a disk within a hard disk drive according to a sample rate, as shown in a block 810. The method 800 also operates by governing the sampling rate by employing only a timing recovery loop signal during a first period of time, as shown in a block 820. The method 800 also involves determining a disk clock at the end of the first period of time, as shown in a block 830.

Thereafter, the method 800 has at least two possible modes of operation. In one mode of operation, the method 800 operates by governing the sampling rate by employing only a disk clock loop signal during a second period of time, as shown in a block 840. For example, this mode of operation as depicted in the block 840 could include eliminating any frequency tracking effect employed to govern the sampling rate.

Alternatively, in another mode of operation, the method 800 operates by governing the sampling rate by employing a combination of the timing recovery loop signal and the disk clock loop signal during the second period of time, as shown in a block 842. For example, this mode of operation as depicted in the block 842 could include reducing or tuning down the frequency tracking effect employed to govern the sampling rate.

Figure 9:
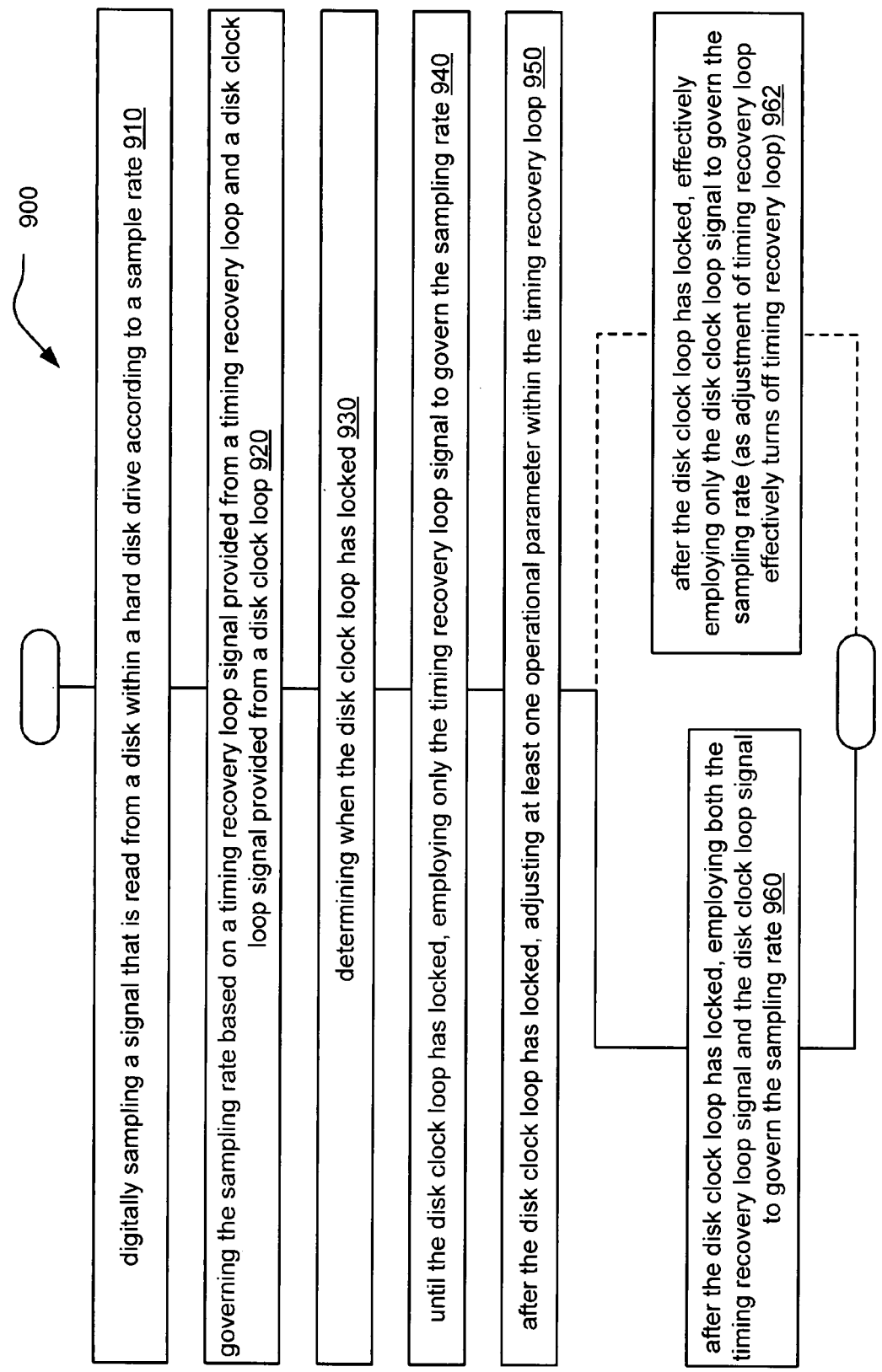
FIG. 9 illustrates an embodiment of a method that is operable to perform timing recovery.

FIG. 9 illustrates an embodiment of a method 900 that is operable to perform timing recovery. The method 900 involves digitally sampling a signal that is read from a disk within a hard disk drive according to a sample rate, as shown in a block 910. The method 900 then continues by governing the sampling rate based on a timing recovery loop signal provided from a timing recovery loop and a disk clock loop signal provided from a disk clock loop, as shown in a block 920 this can involve using either the timing recovery loop signal or the disk clock loop signal. Alternatively, this can involve using some combination of the timing recovery loop signal or the disk clock loop signal.

The method 900 then continues by determining when the disk clock loop has locked, as shown in a block 930. Until the disk clock loop has locked, the method 900 involves employing only the timing recovery loop signal to govern the sampling rate, as shown in a block 940. After the disk clock loop has locked, the method 900 involves adjusting at least one operational parameter within the timing recovery loop, as shown in a block 950.

Thereafter, the method 900 has at least two possible modes of operation. In one mode of operation, after the disk clock loop has locked, the method 900 operates by employing both the timing recovery loop signal and the disk clock loop signal to govern the sampling rate, as shown in a block 960. For example, this mode of operation as depicted in the block 960 could include adjusting the gain of one or more amplification modules that affect the timing recovery loop signal.

Alternatively, in another mode of operation, after the disk clock loop has locked, the method 900 operates by effectively employing only the disk clock loop signal to govern the sampling rate, as shown in a block 962. This is implemented because the adjustment of the timing recovery loop effectively turns off timing recovery loop. For example, the timing recovery loop signal can still be employed to govern the sampling rate, at least in part, but much of the frequency tracking affect there from can be reduced or tuned down in this embodiment.

It is also noted that the methods described within the preceding figures may also be performed within any appropriate system and/or apparatus designs without departing from the scope and spirit of the invention.

In view of the above detailed description of the invention and associated drawings, other modifications and variations will now become apparent. It should also be apparent that such other modifications and variations may be effected without departing from the spirit and scope of the invention.

What is claimed is:

1. An apparatus, comprising:
   an analog to digital converter that is operable to sample a signal read from a disk within a hard disk drive thereby generating a read signal stream;
   a phase locked loop that is operable to govern a sampling rate of the analog to digital converter; and wherein:
   the phase locked loop is operable to receive a timing recovery loop signal generated by a timing recovery loop processing the read signal stream and a disk clock loop signal generated by a disk clock loop processing the read signal stream;
   until the disk clock loop has locked, the phase locked loop is operable to employ only the timing recovery loop signal of the timing recovery loop signal and the disk clock loop signal;
   after the disk clock loop has locked, at least one operational parameter within the timing recovery loop is adjusted; and
   after the disk clock loop has locked, the phase locked loop includes both the timing recovery loop signal and the disk clock loop signal.

2. The apparatus of claim 1, wherein:
   the timing recovery loop includes a timing recovery loop filter that includes an amplification module having a gain; and
   after the disk clock loop has locked thereby determining a disk clock, the gain is adjusted.

3. The apparatus of claim 1, wherein:
   the timing recovery loop includes a timing recovery loop filter that includes a first amplification module having a first gain and a second amplification module having a second gain; and
   after the disk clock loop has locked thereby determining a disk clock, the first gain is adjusted by a first amount and the second gain is adjusted by a second amount.

4. The apparatus of claim 1, wherein:
   the disk clock loop includes a firmware module that is operable to govern the adjustment of the at least one operational parameter within the timing recovery loop after the disk clock loop has locked.

5. The apparatus of claim 1, wherein:
   after the disk clock loop has locked thereby determining a disk clock, and after the disk clock loop detects a change in the disk clock, at least one additional operational parameter within the timing recovery loop is adjusted.

6. The apparatus of claim 1, wherein:
   after the disk clock loop has locked thereby determining a disk clock, and when the disk clock loop detects a change in the disk clock, the at least one operational parameter within the timing recovery loop is re-adjusted.

7. The apparatus of claim 1, wherein:
   after the disk clock loop has locked, the adjustment of the at least one operational parameter within the timing recovery loop turns off the timing recovery loop such that the timing recovery loop signal provided thereby no longer includes frequency tracking information.

8. The apparatus of claim 1, wherein:
   the timing recovery loop includes a timing gradient estimator; and
   the timing gradient estimator couples to the timing recovery loop filter.

9. The apparatus of claim 1, wherein:
   the timing recovery loop includes a timing recovery phase accumulator;
   the timing recovery loop filter couples to the timing recovery phase accumulator; and
   the timing recovery phase accumulator couples to the phase locked loop.

10. The apparatus of claim 1, wherein:
    the disk clock loop is operable to determine a disk clock that corresponds to a rotational rate of the disk within the hard disk drive.

11. An apparatus, comprising:
    a disk clock loop that is operable to process a read signal stream to determine a disk clock that corresponds to a rotational rate of a disk within a hard disk drive; and
    a timing recovery loop, that includes a timing recovery loop filter, that is operable to process the read signal stream to determine a timing recovery loop signal, wherein at least one parameter of the timing recovery loop filter is adjusted after the disk clock loop has locked.

12. The apparatus of claim 11, further comprising:
    an analog to digital converter that is operable to sample a signal that is read from a disk within a hard disk drive; and
    a phase locked loop that is operable to govern a sampling rate of the analog to digital converter; and wherein:

the phase locked loop is operable to receive the timing recovery loop signal provided from the timing recovery loop and the disk clock loop signal provided from the disk clock loop.

13. The apparatus of claim 12, wherein:
until the disk clock loop has locked, the phase locked loop employs only the timing recovery loop signal of the timing recovery loop signal and the disk clock loop signal;
after the disk clock loop has locked, at least one operational parameter within the timing recovery loop is adjusted; and
after the disk clock loop has locked, the phase locked loop includes both the timing recovery loop signal and the disk clock loop signal.

14. The apparatus of claim 11, wherein:
the timing recovery loop filter includes an amplification module having a gain; and
after the disk clock loop has locked thereby determining the disk clock, the gain is adjusted.

15. The apparatus of claim 11, wherein:
the timing recovery loop filter includes a first amplification module having a first gain and a second amplification module having a second gain; and
after the disk clock loop has locked thereby determining the disk clock, the first gain is adjusted by a first amount and the second gain is adjusted by a second amount.

16. The apparatus of claim 11, wherein:
the disk clock loop includes a firmware module that is operable to govern the adjustment of the at least one operational parameter within the timing recovery loop after the disk clock loop has locked.

17. The apparatus of claim 11, wherein:
after the disk clock loop has locked thereby determining the disk clock, and after the disk clock loop detects a change in the disk clock, at least one additional operational parameter within the timing recovery loop is adjusted.

18. A method, comprising:
digitally sampling a signal that is read from a disk within a hard disk drive according to a sample rate thereby generating a read signal stream;
governing the sampling rate of the digitally sampling based on a timing recovery loop signal generated by a timing recovery loop processing the read signal stream and a disk clock loop signal generated by a disk clock loop processing the read signal stream;
determining when the disk clock loop has locked;
until the disk clock loop has locked, employing only the timing recovery loop signal of the timing recovery loop signal and the disk clock loop signal to govern the sampling rate;
after the disk clock loop has locked, adjusting at least one operational parameter within the timing recovery loop; and
after the disk clock loop has locked, employing both the timing recovery loop signal and the disk clock loop signal to govern the sampling rate.

19. The method of claim 18, wherein:
the timing recovery loop includes a timing recovery loop filter that includes an amplification module having a gain; and further comprising:
after the disk clock loop has locked thereby determining a disk clock, adjusting the gain.

20. The method of claim 18, further comprising:
after the disk clock loop has locked thereby determining a disk clock, monitoring the disk clock for any changes therein; and
after the disk clock loop has locked, and after detecting a change in the disk clock, adjusting at least one additional operational parameter within the timing recovery loop.

21. An apparatus, comprising:
an analog to digital converter that is operable to sample a signal that is read from a disk within a hard disk drive;
a digital interpolation filter that is operable to resample the sampled signal generated by the analog to digital converter thereby generating a read signal stream;
a phase locked loop that is operable to govern a sampling rate of the analog to digital converter; and wherein:
the digital interpolation filter is operable to receive a timing recovery loop signal generated by a timing recovery loop processing the read signal stream;
the phase locked loop is operable to receive a disk clock loop signal generated by a disk clock loop processing the read signal stream;
until the disk clock loop has locked, the phase locked loop is not operable to adjust the sampling rate of the analog to digital converter based on the disk clock loop signal and the resampling as performed by the digital interpolation filter is directed by the timing recovery loop signal;
after the disk clock loop has locked, at least one operational parameter within the timing recovery loop is adjusted; and
after the disk clock loop has locked, the phase locked loop is operable to adjust the sampling rate of the analog to digital converter based on the disk clock loop signal and the resampling as performed by the digital interpolation filter continues to be directed by the timing recovery loop signal.

22. The apparatus of claim 21, wherein:
the timing recovery loop includes a timing recovery loop filter that includes an amplification module having a gain; and
after the disk clock loop has locked thereby determining a disk clock, the gain is adjusted.

23. The apparatus of claim 21, wherein:
the timing recovery loop includes a timing recovery loop filter that includes a first amplification module having a first gain and a second amplification module having a second gain; and
after the disk clock loop has locked thereby determining a disk clock, the first gain is adjusted by a first amount and the second gain is adjusted by a second amount.

24. The apparatus of claim 21, wherein:
the disk clock loop includes a firmware module that is operable to govern the adjustment of the at least one operational parameter within the timing recovery loop after the disk clock loop has locked.

25. The apparatus of claim 21, wherein:
after the disk clock loop has locked thereby determining a disk clock, and after the disk clock loop detects a change in the disk clock, at least one additional operational parameter within the timing recovery loop is adjusted.

26. The apparatus of claim 21, wherein:
after the disk clock loop has locked thereby determining a disk clock, and when the disk clock loop detects a change in the disk clock, the at least one operational parameter within the timing recovery loop is re-adjusted.

27. The apparatus of claim 21, wherein:

after the disk clock loop has locked, the adjustment of the at least one operational parameter within the timing recovery loop turns off the timing recovery loop such that the timing recovery loop signal provided thereby no longer includes frequency tracking information.

28. The apparatus of claim 21, wherein:

the timing recovery loop includes a timing gradient estimator; and the timing gradient estimator couples to the timing recovery loop filter.

29. The apparatus of claim 21, wherein:

the timing recovery loop includes a timing recovery phase accumulator;

the timing recovery loop filter couples to the timing recovery phase accumulator; and the timing recovery phase accumulator couples to the phase locked loop.

30. The apparatus of claim 21, wherein:

the disk clock loop is operable to determine a disk clock that corresponds to a rotational rate of the disk within the hard disk drive.

* * * * *